United States Patent [19]
Mooty

[11] Patent Number: 5,457,890
[45] Date of Patent: Oct. 17, 1995

[54] SCALABLE MEASURING APPARATUS AND DISPLACEMENT DISPLAY DEVICE, SYSTEM AND METHOD

[76] Inventor: Glenn J. Mooty, 20580 Henwood Dr., San Jose, Calif. 95120

[21] Appl. No.: 34,524

[22] Filed: Mar. 22, 1993

[51] Int. Cl.⁶ .................................................. G01C 15/06
[52] U.S. Cl. ........................ 33/294; 33/293; 33/706
[58] Field of Search .......................... 33/290, 293, 294, 33/706, 772, 773, 775, 778, 741, 295, DIG. 21

[56] References Cited

U.S. PATENT DOCUMENTS

| | | | |
|---|---|---|---|
| 3,105,303 | 10/1963 | Frizzell | 33/74 |
| 3,857,639 | 12/1974 | Mason | 356/156 |
| 3,972,622 | 8/1976 | Mason et al. | 356/172 |
| 4,029,415 | 6/1977 | Johnson | 356/4 |
| 4,217,696 | 8/1980 | Schindler | 33/774 |
| 4,339,880 | 7/1982 | Hall | 33/293 |
| 4,653,910 | 3/1987 | Poling | 33/294 X |
| 4,820,041 | 4/1989 | Davidson et al. | 356/1 |
| 4,851,835 | 7/1989 | Krumholz et al. | 340/870.37 |
| 4,879,552 | 11/1989 | Arai et al. | 340/870.37 |
| 4,926,561 | 5/1990 | Miller | 33/293 |
| 4,993,160 | 2/1991 | Fraley | 33/286 |
| 5,035,064 | 7/1991 | Care | 33/760 |
| 5,189,484 | 2/1993 | Koschmann et al. | 33/293 X |

FOREIGN PATENT DOCUMENTS

| | | | |
|---|---|---|---|
| 1542795 | 10/1968 | France | 33/293 |
| 2751620 | 5/1978 | Germany. | |
| 55-36726 | 3/1980 | Japan. | |
| 9014576 | 11/1990 | WIPO. | |

*Primary Examiner*—Alvin Wirthlin
*Attorney, Agent, or Firm*—Flehr, Hohbach, Test, Albritton & Herbert

[57] ABSTRACT

Scalable measuring apparatus for use by an operator with a laser beam from a laser-level transmitter comprising a vertically disposed grade pole having lower and upper extremities. A laser-level receiver is provided for detecting the laser level beam. A controller is mounted on the grade pole and carries the laser-level receiver. At least a portion of the controller is capable of ascending and descending the grade pole. An indicator is electrically coupled to the laser-level receiver for giving a response perceptible to the operator when the laser beam is detected by the laser-level receiver. The controller has a brake for retaining the controller at a predetermined elevation with respect to the grade pole. The controller is capable of ascending and descending the grade pole which is free of markings.

9 Claims, 6 Drawing Sheets

SCALABLE MEASURING APPARATUS AND DISPLACEMENT DISPLAY DEVICE, SYSTEM AND METHOD

This invention relates to a scalable measuring apparatus and, more particularly, to a scalable grade measuring apparatus having a displacement display device, system and method.

At the present time, many grading operations are being carried out by the project being staked out by a civil engineer by the placement of gradestakes. Errors in placing the gradestakes can cause overcutting or undercutting, which only may become apparent during the grading operation or subsequent thereto. Typically a laser may be set up to establish a level reference and then the necessary calculations must be made manually to determine the cut and fill. While this is occurring, the grading equipment stands idle, increasing the cost to the grading contractor. Errors are frequent and expensive. One attempt to alleviate these problems a rod was provided with an electronic level which gives an elevation relative to sea level. It has been found that this device is bulky and awkward to use. In addition, its readings can be confusing to the workmen in the field. Such a device is particularly difficult to use in connection with a sloping pad or a sloping pipeline. More complicated devices have also been suggested as for example one in which a laser beam is utilized to obtain grade and range distances with the use of a grade pole which has a laser beam detection unit slidably mounted thereon. Such apparatus appears to be unduly complicated and expensive and requires highly skilled labor. There is therefore a need for a new and improved measuring apparatus which is scalable to facilitate its use with sloping grades as well as for other uses.

In general, it is an object of the present invention to provide a measuring apparatus which is scalable and a system and method utilizing the same.

Another object of the invention is to provide an apparatus, system and method of the above character which can utilize a grade pole which has no markings thereon.

Another object of the invention is to provide an apparatus, system and method of the above character which performs mathematical operations without requiring the user to explicitly enter or transcribe numbers, and error-prone task.

Another object of the invention is to provide an apparatus, system and method of the above character which has a displacement display device.

Another object of the invention is to provide an apparatus and system of the above character which has a dual display.

Another object of the invention is to provide an apparatus and system of the above character in which a quadrature shaft encoder is utilized which is fast, has high resolution, requires low power and is low cost and reliable.

Another object of the invention is to provide an apparatus and system of the above character which can be utilized for measuring large variations in grade.

Another object of the invention is to provide an apparatus and system of the above character in which a motorized remote unit is utilized.

Another object of the invention is to provide an apparatus of the above character which the grade pole is relatively inexpensive.

Another object of the invention is to provide an apparatus of the above character which has a low battery power consumption.

Another object of the invention is to provide an apparatus, system and method of the above character which can be utilized by relatively unskilled personnel.

Another object of the invention is to provide an apparatus, system and method of the above character which is relatively simple to manufacture.

Additional objects and features of the invention will appear from the following description in which the preferred embodiments are set forth in detail in conjunction with the accompanying drawings.

In general, the scalable measuring apparatus incorporating the present invention is for use by an operator with a laser beam rotating in a level, generally horizontal plane supplied by a laser-level transmitter. A vertically disposed grade pole is provided which has upper and lower extremities. A laser-level receiver is provided for detecting the laser-level beam. A controller is slidably mounted on the grade pole and carries the laser-level receiver. The controller includes either manually operated means or motorized means to cause movement of the controller vertically up and down the grade pole to thereby move the laser-level receiver carried thereby to an elevation so that said receiver can detect the laser-level beam. Indicator means is electrically coupled to the laser-level receiver for giving a response which is perceptible to the operator when the laser beam is detected by the laser-level receiver. The controller includes means for inserting a scale factor representing the slope of the desired grade. Means is provided for causing the controller to sense the vertical travel of the grade pole such that when the laser-level receiver is in the laser plane, the controller displays or otherwise indicates a number corresponding to the elevation of the lower extremity of the grade pole.

Figure 1:
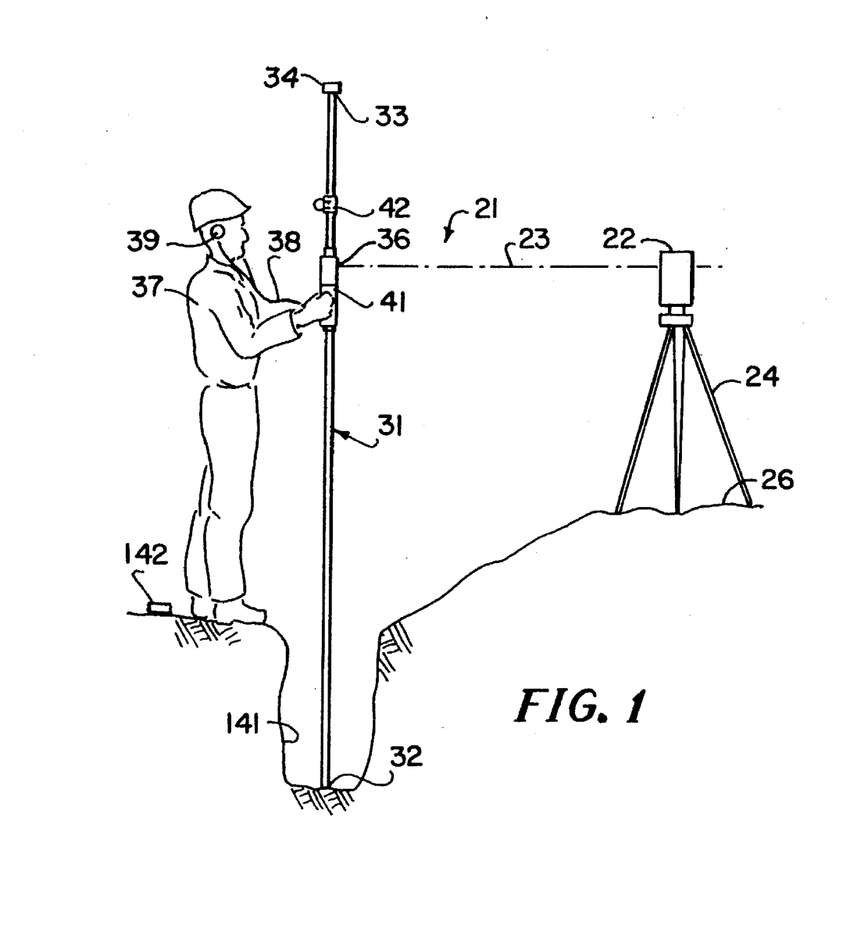
FIG. 1 is an illustration showing the use of a manually operable scalable distance measuring apparatus and system incorporating the present invention and utilizing the method of the present invention for establishing the grade for a slope.

More in particular, as shown in FIGS. 1–6 of the drawings, the scalable measuring apparatus and system 21 incorporating the manually operated embodiment of the present invention consists of a laser-level transmitter 22 of a conventional type which transmits a laser beam 23 rotating in a level or horizontal plane as shown in FIG. 1. The transmitter 22 is supported in a suitable manner such as by a tripod 24 which is mounted on a suitable support such as the ground 26, as shown in FIG. 1.

The apparatus and system 21 also includes a grade pole 31 having a lower extremity 32 and an upper extremity 33. A keeper 34 may be mounted on the upper extremity 33. However, it may not be necessary as hereinafter described. The grade pole 31 can be formed of a suitable material, as for example a relatively rigid plastic pipe such as Schedule 40 PVC pipe of a suitable inside diameter, as for example ranging from ½ inch to 2 inches. It can be provided without any markings.

A laser-level receiver 36 of a conventional type forms a part of the system and is adapted to receive the laser beam 23 and gives an indication visibly or audibly which is ascertainable by an operator 37 when the receiver 36 is at a level or elevation which corresponds to the level or elevation of the rotating laser beam 23. In the embodiment shown in FIG. 1, the receiver 36 gives its indication to the operator 37 through a flexible cord 38 which is connected to the receiver 36 and to an ear piece or ear pieces 39 worn by the operator 37. Thus, when an audible response is received in the ear pieces 39, the operator knows that the receiver 36 is at the level of the laser beam 23.

The apparatus and system 21 also includes a controller 41 which is movably mounted on the grade pole 31 for movement longitudinally thereof and generally in a vertical or up and down direction. The apparatus and system also includes a spring clamp 42 of a conventional type such as made by ACCO which frictionally engages the grade pole as adapted to be engaged by two fingers of the hand to open the same so that it can be moved vertically of the grade pole 31 to a desired position as hereinafter described. The controller 41 consists of a housing 46 formed of a suitable material such as a molded plastic and is provided in first and second parts 46a and 46b. Part 46a being considered as the main part and 46b as a secondary part or a cover. The part 46a is provided with internally disposed upstanding bosses 47 which are adapted to mate with upstanding bosses 48 provided on the part 46b. The two parts 46a and 46b are adapted to be fastened together with the bosses 47 and 48 mating with each by a suitable means such as screws 49 extending into the bosses.

A tube 51 extends through the housing and can be formed of a suitable material such as an aluminum extrusion. As shown, particularly in FIG. 4, the tube 51 can be rectangular in cross section, as for example square, and can have a suitable length but preferably in connection with calibration of the present invention should have a length which is exactly one foot. The rectangular extrusion in the form of the tube 51 is provided with an interior space 54 which is sized so that it is adapted to receive the grade pole 31 of the size being utilized. The space 54 extending longitudinally of the tube 51 must be sized wider than the outside diameter of grade pole 31 so as to accommodate grade pole 31 and to permit movement of grade pole 31 relative to tube 51.

Brake shoe means 56 is provided in the tube 51 which is yieldably urged into engagement with a grade pole 31 for retaining the controller 41 in a predetermined elevated position with respect to the grade pole 31. Such means consists of a pair of spaced-apart brake shoes 57 which are provided with arcuate surfaces 58 that are adapted to engage the cylindrical outer surface of the grade pole 31. The brake shoes 57 extend through an elongate slot 59 provided in the rectangular tube 51. The brake shoes 57 are formed of a suitable material such as PVC and are carried by a large rectangular block or member 61 and which also can be formed of a suitable material such as PVC. When formed of PVC, the brake shoes 57 can be formed integral with the block 61. Alternatively, the brake shoes 57 can be secured to the block or member 61 by a suitable means such as an adhesive. The block or member 61 is sized so that it can fit within the part 46a of the housing 46 and extends between the upper and lower walls of the same. Means is provided within the housing 46 for yieldably urging the block or member 61 with the brake shoes 57 carried thereby in a direction towards the grade pole 31 so that the arcuate surfaces 58 of the brake shoes 57 engage the grade pole 31 to retain the controller 41 and the receiver 36 carried thereby in a desired predetermined position vertically on the grade pole 31. This yieldable means is in the form of a leaf spring 62 formed of a suitable material such as spring metal which has each of its ends 62a and 62b formed into a generally U-shaped bend which surrounds the two posts 47 provided as a part of the housing at one side of the housing. The intermediate portion 62c of the leaf spring is normally bowed outwardly and engages the block or member 61. The bowing of the leaf spring 62 and the size of the block or member 61 is such so that a yieldable spring force normally urges the block or member 61 in a direction towards the grade pole 31.

Means is provided for causing movement of the block or member 61 away from the grade pole 31 against the force of the leaf spring 62 and consists of a large elongate hole 64 extending vertically of the block or member 61 and which is sized so that it is large enough to receive the four fingers of a human hand. Corresponding aligned holes 66 and 67 are provided in the parts 46a and 46b, respectively, of the housing 46 and are generally of the same size and shape of the hole 64 to permit the human hand to be inserted through either of the holes 66 or 67 to engage the block or member 61 with the fingers of the hand to move it in a direction away from the grade pole 31 to release the brake shoes 57 from the grade pole 31 to permit raising and lowering of the controller 41 relative to the grade pole 31. The block or member 61 is provided with beveled surfaces 71 so that the block or member 61 clears the upstanding posts 47. The leaf spring 62 is compressed when the brake shoes 57 are moved out of engagement with the grade pole 31. If desired seals 72 formed of a suitable material such as felt or rubber are provided on the sides of the block or member 61 adjacent the holes 66 and 67 to inhibit dust or moisture from coming from the exterior into the interior of the housing 46. The seals 72 are provided with holes 73 corresponding to the hole 64 provided in the block or member 61.

Figure 2:
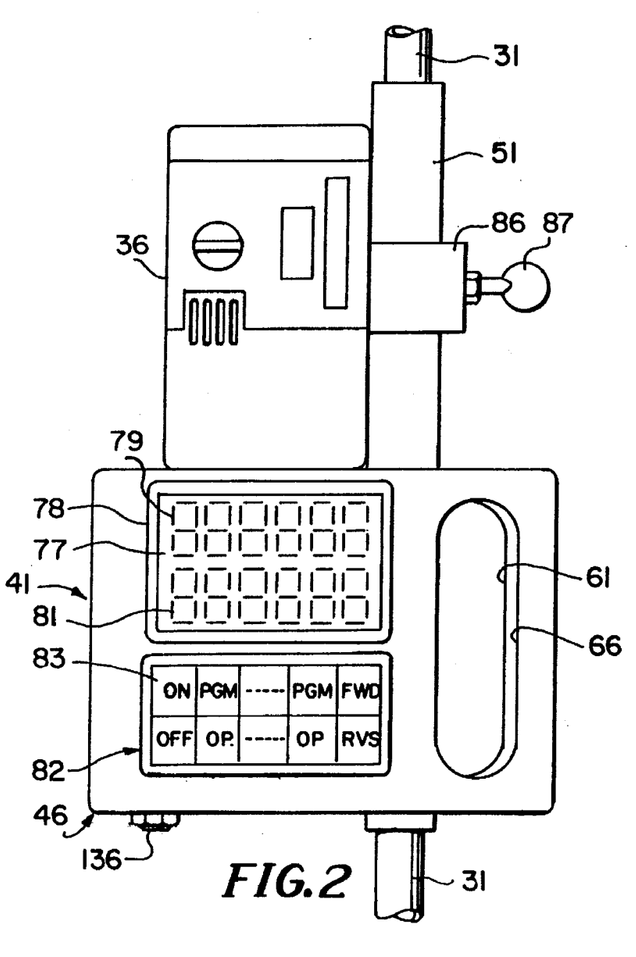
FIG. 2 is an enlarged front-elevational view showing the control unit and laser-level receiver utilized on the grade pole shown in FIG. 1 and forming a part of the apparatus and system shown in FIG. 1.
Figures 3, 4, 5:
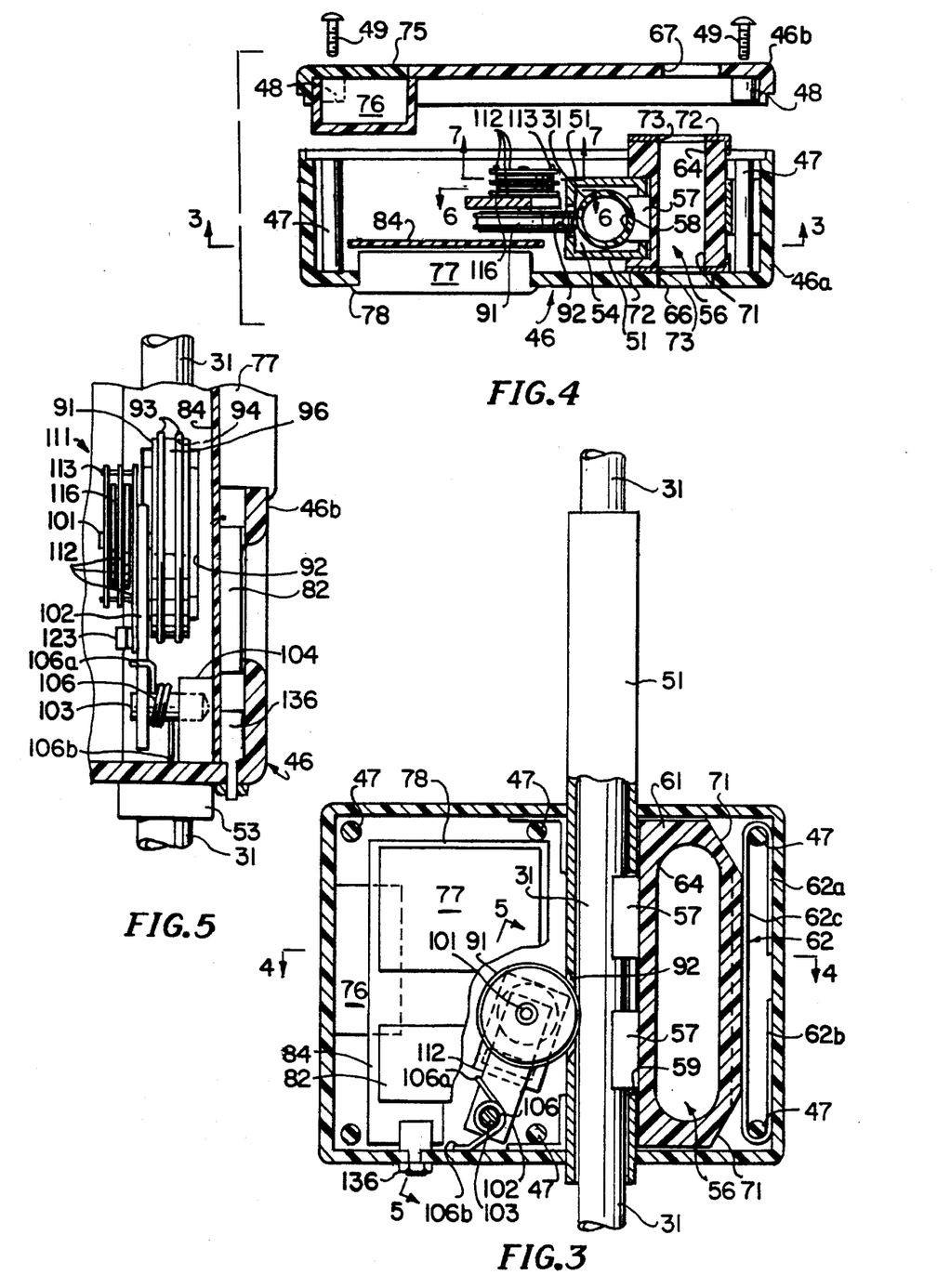
FIG. 3 is a cross-sectional view of the controller shown in FIG. 2 taken along the line 3—3 of FIG. 4.
FIG. 4 is a cross-sectional view taken along the line 4—4 of FIG. 3.
FIG. 5 is a cross-sectional view taken along the line 5—5 of FIG. 3.

A battery compartment 76 is carried within the cover part 46b and is accessible when the lid 75 is slidably removed. An LCD display module 77 is mounted using a bezel 78 in the part 46a of the housing 46 and is provided with two rows 79 and 81 of 6 digits each which are visible from the exterior of the controller 41 as shown in FIG. 2. A switch panel 82 is provided below the LCD display 77 and is provided with a plurality of switches 83 which are accessible from the exterior of the housing 46. They are labeled with appropriate functions and are connected to electrical circuitry hereinafter described carried by a PC board 84 mounted within the housing 46. The switches 83 are of a type that only consume power when they are being pressed such as single-pole/single-throw momentary normally-open switches.

The receiver 36 is secured to the controller 41 by a clamp 86 which is provided with a hand operated thumb screw 87 to clamp the receiver 36 to the rectangular tube 51.

Means is provided for sensing the movement of the controller 41 vertically of the grade pole 31 and consists of a wheel 91 formed of a suitable low mass material such as plastic. The wheel 91 protrudes through an elongated slot 92 provided in the rectangular tube 51 and is adapted to frictionally engage the grade pole 31 (see FIG. 4). In order to ensure good frictional engagement between the wheel 91 and the grade pole 31, a pair of spaced-apart O-rings 93 are mounted in arcuate recesses 94 provided in the peripheral surface 96 of the wheel 91. The sensing wheel 91 is mounted on a shaft 101 which is rotatably mounted in an arm 102 which has its lower extremity pivotally mounted on a screw 103 which is threadedly mounted in a boss 104 provided as a part of the housing 46. Yieldable spring means in the form of a coil spring 106 mounted on the screw 103 urges the upper extremity of the arm 102 in a direction towards the grade pole 31. The coil spring 106 has one end 106a engaging the arm 102 (see FIG. 5) and has the other end 106b engaging the housing 46.

Shaft encoding means 111 is provided for encoding the rotation of the shaft 101 which carries the wheel 91. The shaft encoding means 111 in order to utilize a minimum of power is in the form of capacitive coupling means and consists of a plurality of printed circuit boards 112 which are secured to the arms 102 by suitable means such as screws 113. The printed circuit boards 112 are maintained in spaced-apart generally parallel planes and have disposed therebetween but out of contact therewith rotatable printed circuit boards 116 which are mounted on the encoding shaft 101 which carries the wheel 91. The rotatable printed circuit boards 116 can be made in the same manner as conventional double-sided printed circuit boards with a layer of insulating material forming the support structure with metal patterns disposed on opposite sides of the same. These metal patterns can be made with conventional masking techniques. The printed circuit boards 112 can be made similarly except having three conductive layers instead of two. The patterns on each side of each of the boards 112 and 116 are identical to the patterns on the opposite side and are interconnected. The space between adjacent PC boards 112 and 116 is preferably filled with an insulating substance to provide insulators (not shown) having a high dielectric constant so as to increase capacitances there between and thereby increase the signal-to-noise ratio and resolution. This may be achieved by affixing a layer of such insulating substance to at least one board with a suitable adhesive means. For example, lead magnesium niobate or polytetrafluoroethylene (Teflon) film with a matte finish may be affixed using an epoxy adhesive. Insulators with low friction coefficients are desirable to permit PC boards 116 to rotate relative to the PC boards 112 without causing slippage of wheel 91 relative to grade pole 31. Solid insulators also provide alignment, allowing PC boards 112 and 116 to be closer together.

Figure 6:
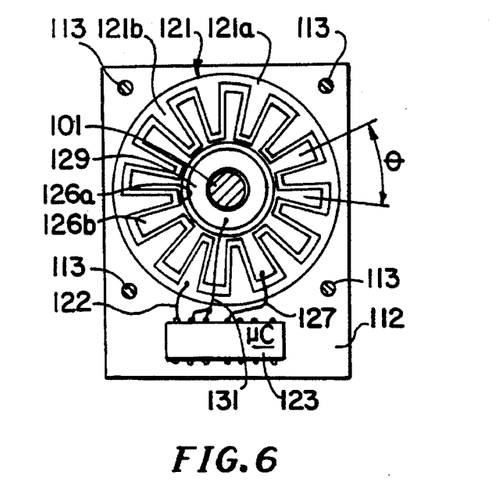
FIG. 6 is a cross-sectional view taken along the line 6—6 of FIG. 4.
Figure 7:
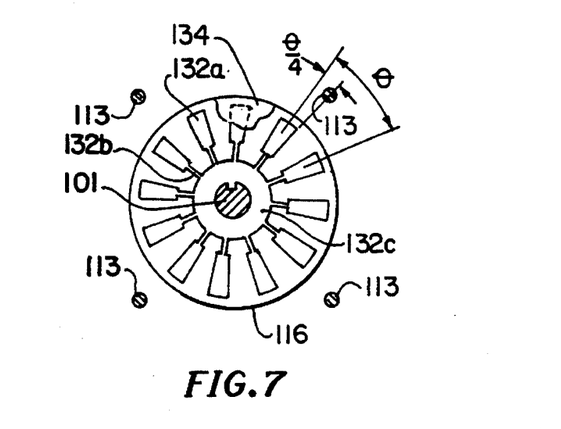
FIG. 7 is a cross-sectional view taken along the line 7—7 of FIG. 4.
Figure 8:
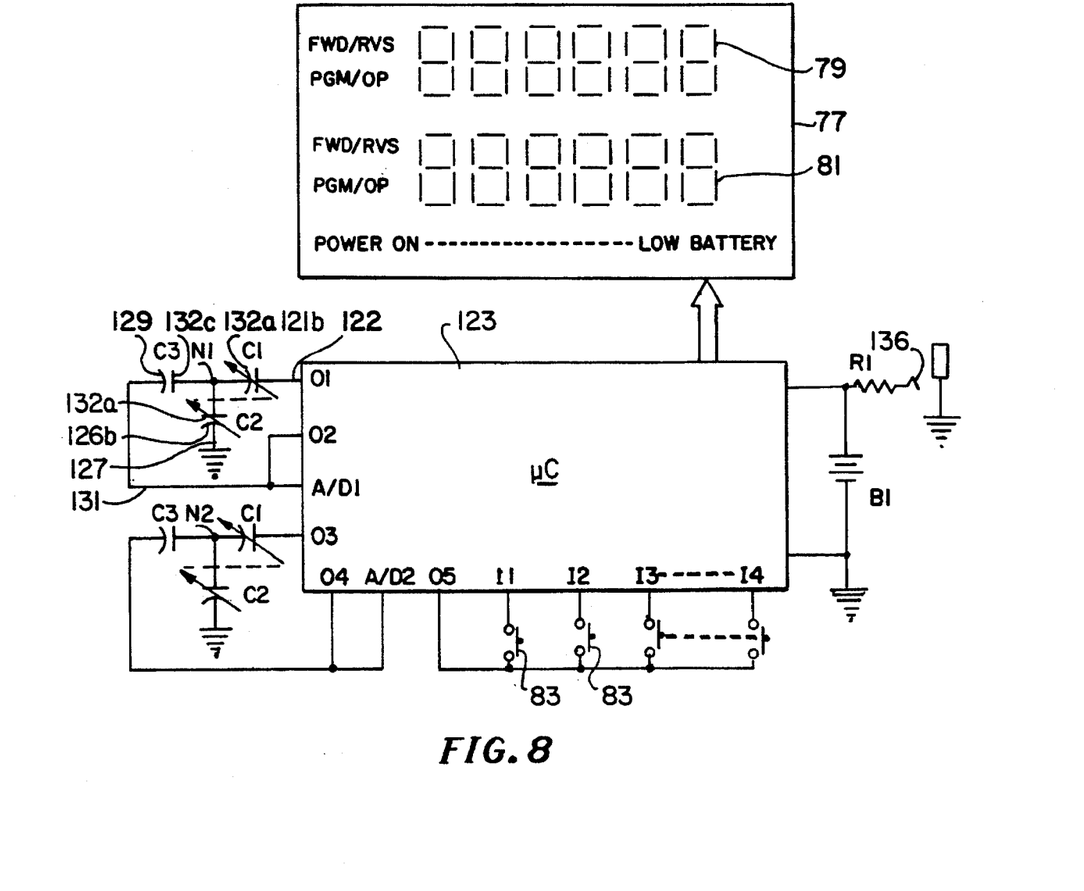
FIG. 8 is a circuit diagram partially in block form of the electronics incorporated in the controller shown in FIG. 2.

As can be seen from FIGS. 6 and 7, the patterns provided on the printed circuit boards 112 and 116 are interdigitated and are formed of a suitable conductive material such as copper so that they can form one of the two plates of a capacitor. The PC board 112 carries an outer circular pattern 121 which is connected by a lead 122 to a microcontroller 123 mounted on the printed circuit board 112 and is connected to the 01 terminal as shown in FIG. 8. The outer circular pattern 121 consists of a circular outer annular portion 121a with inwardly extending radially extending tapered finger portions 121b. The stationary PC boards 112 are also provided with inner circular patterns 126 with an inner annular portion 126a and outwardly radially extending outwardly tapered finger portions 126b which are disposed between the finger portions 121b. This inner circular pattern 126 is connected by a lead 127 to ground as shown in FIG. 8. Another inner annular pattern 129 is provided on the PC boards 112 and is connected by a lead 131 to the A/D terminal of the microcontroller 123 (see FIG. 8).

A pattern 132 is provided on the rotatable printed circuit boards 116 (see FIG. 7) and consists of an inner annular portion 132c and is connected to a plurality of circumferentially spaced-apart radially extending stem-like portions 132b that are connected to radially extending paddle or fan-like portions 132a that are circumferentially spaced-apart and have outwardly extending tapers. Paddle portions 132a are virtually identical to finger portions 121b in size, shape and count. Paddle portions 132a are also virtually identical to finger portions 126b in size, shape and count. Annular portions 132c and 129 have virtually identical diameters as each other. The pattern 132 constitutes the node N1 (see FIG. 8). As hereinbefore explained a layer 134 of an insulating material can overly the pattern 132.

In order to obtain information as to direction of rotation it is necessary to obtain two channels of information in quadrature. For this reason, one of the rotatable PC boards 116 is offset by suitable angle as for example θ/4 where θ is the angle between the centerlines of two adjacent fan portions 132a. Since the rotatable PC boards 116 are affixed to the same shaft 101, this angular displacement of at least one of the rotatable PC boards 116 with respect to the other PC board will be maintained during rotation of the rotatable PC boards 116 upon rotation of the shaft 101. Any rotatable PC boards 116 so offset are part of the second of the two quadrature channels and constitute node N2 in FIG. 8, and not N1.

Since this angular displacement is required, the capacitive shaft encoder 111 must have at least three plates with two of these three being rotatable with the shaft 101 with one being angularly displaced with respect to the other and with one fixed plate with 3 nodes on it. However, it is generally desirable to have more than one fixed stationary PC board 112 because the additional PC boards 112 provide increased signal-to-noise ratios by providing electrostatic shielding and increased desirable capacitances to overcome undesirable capacitances such as are present at the A/D inputs of microcontroller 123. Thus, a typical capacitive sandwich would be comprised of five printed circuit boards with two being rotatable and three being stationary. Such a sandwich can be repeated to increase signal-to-noise ratios further. A conductive cover (not shown) connected to the negative battery terminal may enclose the sandwich to provide electrical shielding from external noise.

A jack 136 is provided in the housing for receiving a plug for supplying battery power externally of the housing in the event that becomes necessary because of a failed battery provided within the housing. This plug is shown schematically in FIG. 8 and as shown therein is connected through a resistor R1 to a battery B1 which is connected to the microcontroller 123.

The microcontroller 123 is of a conventional type, as for example one integrated circuit in the Cop series manufactured by National Semiconductor, the Intel 80C51 series or General Instruments PC 1650 series or almost any kind of ASIC device. The microcontroller 123 output O1 terminal (see FIG. 8) is electrically connected to the outer ring pattern 121 to supply output signal to the stationary side of the capacitor C1 (see FIG. 8). The other plate of the capacitor C1 is the pattern 132a on the rotatable PC board 116. This same pattern 132a on the rotatable PC board 116 forms one of the plates of the capacitor C2 and is part of node N1. The stationary plate of the capacitor C2 is the inner circular pattern 126 which is connected to electrical ground. Node N1 is also connected to the movable plate 132c and is one plate of the capacitor C3. The other plate of capacitor C3 is the inner annular portion 129 on the stationary PC board 112 and is connected to the analog-to-digital-conversion input of the microcontroller 123. This capacitive network provides the input to the microcontroller 123 for both the top row 79 and the bottom row 81 of the LCD display 77. The microcontroller 123 is also provided with a plurality of input terminals which are connected to the momentary contact switches 83 as shown in FIG. 8.

The operation of such a microcontroller 123 in accordance with the present invention may now be briefly described as follows. The microcontroller 123 provides an output on 02 which discharges the capacitor C3 while the output 01 of the microcontroller is in its resting state which condition of the microcontroller can be assigned a logic 0. Upon completion of discharge of the capacitors C3 and C1, the output 02 floats permitting the A/D input node to float. At this time, the microcontroller 123 causes output 01 to change its state, as for example from a 0 to a 1. The output pulse produced is carried by the capacitors C1 and C3 to the A/D1 input which senses the voltage change which has occurred. If paddle 132a is in closer proximity to finger 121b than to finger 126b, such voltage change will be large, and if not, such voltage change will be small. The microcontroller 123 thus senses the rotation of the rotatable PC boards 116 with respect to the PC boards 112. As soon as this voltage change has been sensed, the same sequence is repeated: the output 02 discharges the capacitor C3 followed by the above enumerated steps to sense the next voltage change. The microcontroller 123 may cause the repetition rate of said sequence to vary adaptively to save power and still track the wheel rotations. The A/D inputs need only to perform a voltage comparator function to sense the above mentioned voltage change level. In fact a simple logic input may sometimes suffice. When the rotation of PC board 116 is slow a full A/D conversion is performed to interpolate between quadrature states and add much resolution to the distance measurement.

The capacitive node N2 network connected to the terminals 03, 04 and A/D2 of the microcontroller 123 operates in the same manner as the capacitive node N1 network hereinbefore described. The only difference being that the rotatable PC board 116 for the N2 capacitive network is offset at a slight angle, as for example θ/4 hereinbefore described, with the effect that A/D2 input will change its state at a slightly different time than the input A/D1 changes its state. Thus, there are provided two channels of detection to detect in quadrature so that it can be ascertained by the microcontroller 123 whether the rotatable printed circuit boards 116 are rotating clockwise or counter-clockwise. This capacitive shaft encoding scheme costs very little, consumes very little power, senses quickly, and has high resolution.

The microcontroller 123 totalizes algebraically the number of such changes of state, performs the above-mentioned interpolation to refine the totals resulting from totalization, multiples the total by a user-defined scale factor, and performs those logic operations necessary to display the resulting numbers in both rows 79 and 81 of display 77. The scale factor associated with row 79 typically will differ from that associated with row 81, so that for example row 79 may be displaying in feet while row 81 displays in meters. Similarly the rows may differ as to zero reference or as to polarity.

The microprocessor 123 in its operation polls the states of the momentary switches 83. A switch closure would be sensed as long as a physical force is applied to the momentary contact switch 83 in accordance with the polling rate, as for example once every 100 milliseconds, to ascertain the state of the switch. For example, there can be an on/off switch, and a polarity switch for each of the rows 79 and 81 to increment the display in a desired polarity. In other words, in the "forward" condition, the number in the display will increase as the controller 41 ascends the grade pole 31, whereas in the "reverse" position the number in the display will decrease as the controller 41 ascends the grade pole 31. Other switches 83 can indicate whether the display is in the program mode or in the operate mode, the program mode being the one which is used to set the scale factor as hereinafter described.

It should be appreciated in connection with the foregoing that the display 77 can be in the form of a single physical unit or alternatively it can be two physical units. Other switches can be utilized for increasing or decreasing the value of the digit which are being looked at during the program mode. Additional buttons or switches can provide additional features such as are provided by a conventional calculator, to calculate the percent-of-grade, sines, cosines, tangents and the like.

Operation of the scalable grade measuring apparatus and displacement display device and system in conjunction with the method of the present invention may now be briefly described as follows. As is well known to those skilled in the arts, the transmitter 22 with its tripod 24 typically is located the ground 26 at a location which is in range of the site to be measured, as for example the site of a pipeline or a slab and a benchmark. The transmitter 22 is operated to cause it to create a level laser beam 23. After this has been accomplished, the controller 41 which also can be identified as a displacement display device with the receiver 36 mounted thereon is slid onto the grade pole 31 by having the fingers of the hand grasping the controller 41 extend through the holes 64, 66 and 67 permitting the fingers of the hand to grasp the block or member 61 to retract it against the force of the leaf spring 62 so that the brake shoes 57 clear the pole 31 to permit the controller 41 to be slid longitudinally of the pole to a desired position. The block or member 61 can then be released to permit the brake shoes 57 to engage the grade pole 31. The grade pole 31 with the controller 41 mounted thereon can then be taken to the benchmark (not shown) and the lower extremity 32 of the grade pole placed on the benchmark.

If desired a reference elevation can be inserted into the controller 41 as a preset value, for example it can be a four-figure number with two additional digits to the right of the decimal point for the 6 digits provided in each of the display rows 81 and 79. The member 61 of controller 41 can then be grasped by one hand so as to hold the grade pole 31 vertical and steady. By operating the brake mechanism by grasping the block or member 61 as hereinbefore described, the controller 41 can then be moved up and down until the receiver 36 "beeps" indicating that it is at the level of the laser beam 23. As long as the receiver 36 beeps, the numbers shown in each row of the display represent the elevation of the pole's bottom or lower extremity 32, with respect to a reference elevation. By depressing various buttons 83 the reference elevation for either row 79 or 81 of display 77 can be changed as follows. Pushing a "reset" button 83 causes a zero to appear in the associated row of the display 77, or pushing a "preset" button 83 causes a number from the microcontroller's memory to appear in the associated row of the display 77. In turn, the value of the number stored in such preset memory can be changed to any value using other buttons 83.

Let it now be assumed that it is desired to construct a pipeline or pad at a 2% grade, which represents 2 vertical feet within 100 horizontal feet or 1 vertical foot within 50 horizontal feet. It is necessary to divide the standard scale factor, as for example, 0.5635, with the desired grade of 0.02 which gives a new scale factor of 28.17. This new scale factor for the 2% grade or slope can be checked by utilizing a pencil and placing a pencil mark on the grade pole 31 immediately below the rectangular tube 51 and then moving the controller 41 downwardly until 50 feet is read in the display row 79. If the pencil mark appears exactly at the top of the rectangular tube 51, controller 41 has been moved downwardly by exactly 1 foot which is the exact length of the tube 51. This indicates that the slope has been properly set into the controller instrument 41 and that it will properly measure a 2% grade.

The controller instrument 41 having the proper scale factor set therein may now be taken with the grade pole 31 to the starting point which has been established for the pipeline or the slab. The lowermost extremity 32 of the grade pole 31 is then placed on this starting point and while holding the grade pole 31 vertical, the controller 41 is moved to the desired location on the grade pole 31 whereat the receiver 36 begins to beep. At this time, a reset button 83 is pressed to cause the display row 79 to go to 0.

Now let it be assumed that a backhoe operator has begun digging a trench 141 for the pipeline to be installed and wishes to have a grade check made. This can be readily accomplished by utilizing a tape measure 142 which is carried by the operator and which is stretched out on or near the ground and is used to measure the generally horizontal distance from the starting point of the pipeline. The operator 37 uses the tape measure 142 to ascertain the generally horizontal distance from the starting point. Assuming this to be 7 feet, the operator 37 then slides the controller 41 longitudinally of the grade pole 31 until the number 7 appears in the digital display row 79. The operator moves the spring clip 42 so that it is immediately adjacent to the upper extremity of the rectangular tube 51. The backhoe operator then moves out of the way momentarily and the operator 37 places the lower extremity 32 of the grade pole 31 at the bottom of the trench 141 and while holding it there moves the controller 41 until the beeping sound is received from the receiver at which time the operator releases the brake shoe mechanism 56. The spacing between the bottom of the spring clip 42 and the top of the rectangular tube 51 represents the amount of additional cut which must be made by the backhoe operator to dig the ditch to the desired depth. In order for the backhoe operator to readily visualize the additional depth to which he must dig, the clip 42 and the rectangular tube 51 can be painted or anodized black with the grade pole 31 being white or a suitable other color to provide good visual contrast. Since a grade pole can be PVC pipe, a white PVC can be readily used for this purpose.

With a dual display such as shown on controller 41, after the spring clip 42 has been positioned at the upper extremity of the rectangular tube 51 and before moving the controller 41 downwardly as hereinbefore described, the reset button 83 can be operated for the display row 81 which will subsequently at the beep directly indicate in feet the amount of additional cut required, as for example 0.5 feet.

This procedure can be continued as the backhoe operator continues digging. As the backhoe operator progresses from the starting point, the distance from the starting point can be readily measured by use of the tape measure 142 with the measured distance being placed in the controller 41 and then ascertaining whether the trench 141 has been dug to the appropriate depth in the manner hereinbefore described. Thus, it can be seen that the trench 141 can be laid out with a desired slope by matching the display to the tape measure in a very simple foolproof manner by relatively unskilled personnel.

With a controller 41 of the present invention, it is possible to utilize an elevation zero reference which corresponds to either a temporary benchmark at a job site or to sea level elevation. This sea level elevation or a temporary benchmark at a job site can be entered into memory and used in conjunction with the benchmark, at which time the preset button 83 can be pushed to subsequently give the elevations being measured relative to sea level. By utilizing a preset number of "0" the controller 41 can be run in the reverse mode to read the cuts to be made in negative numbers and the fills in positive numbers for the construction of a pipeline or pad at a desired slope as hereinbefore described.

The controller 41 also can be utilized to ascertain the percent of slope, as for example, a fixed distance of 40 feet can be programmed into the controller 41 positioning the grade pole 31 with the controller 41 thereon at 40 feet and then directly reading the percent of slope of the pipeline at the 40 feet. For example, let it be assumed that a building inspector is desirous of checking the slope of an installed pipeline which had been installed in 20 foot increments. Thus, the controller or instrument 41 mounted on the grade rod 31 set in this manner could be utilized to check the grade of each 20 foot section by placing the lower extremity 32 of the grade pole 31 at the joint, reset to 0 and then go the next 20 foot increment to the next joint and read the percent of slope on that particular 20 foot section. After this the reset button can be touched again, the grade pole 31 moved to the next joint to read the percent of slope in that section. Thus, it can be seen that the instrument 41 can serve as an invaluable tool for road builders and the like who need to know the percent of slope between curbs as motorgraders equipped with electronic leveling are operated.

It has been found that the scalable grade measuring apparatus of the present invention has numerous advantages. It makes grade measuring much easier and completely eliminates most cases of arithmetic error. It also makes possible the use of a less skilled personnel. It greatly reduces the time for making grade measurements. Also it facilitates the measurements for sloping grades, tilting walls, etc. It eliminates the need for purchasing or renting expensive surveying tools that are more complicated devices. It eliminates the use of expensive grade sticks permitting inexpensive, commonly available grade sticks or pipes of any length to be utilized. The grade pole need have no markings. The display provided can give the exact altitude of the top or bottom of a grade stick which can be displayed in feet, meters, inches, centimeters, cubits, percent-of-grade, or in any other units of distance measure chosen by the user. The user may choose polarity. As the controller ascends, the number in the display can either increase or decrease as desired, and conversely, upon descent the displayed number can decrease or increase as desired. Using preset and reset features, the user can easily capture a zero-reference directly or indirectly as available. The aforementioned units, polarity, and zero-reference may be entirely different for one display row than for the other display row. This permits use for general-purpose conversion between two linear scales not necessarily related to physical distance. It also permits switching back and forth between two entirely unrelated jobs. Finally, the reference plane, as for example the plane provided by the laser, need not be level but may be vertical or diagonal, and may simply be a fixed object to which controller 41 is affixed directly.

Another embodiment of the scalable grade measuring apparatus 161 is shown in FIGS. 9–15. As shown therein, the apparatus 161 consists of a grade pole 162 having a lower extremity 163 and an upper extremity 164. The grade pole 162 can be of the same type as the grade pole 31, however, it typically is of a greater length so that its upper extremity 164 extends a substantial distance above the head or below the feet of the operator 163. Such a grade pole can be comprised of sections which are detachable from each other by means of unscrewing threaded extremities, or by other means, for convenient transportation and storage. The apparatus 161 includes an instrument or controller 166 which is provided in two separate units, one a local unit 167 and the other a remote unit 168. The remote unit 168 has the receiver 36 secured thereto by the clamp 86 and its thumb screw 87. The remote unit 168 is connected by a cord 169 to the local unit 167. The local unit 171 is adapted to be secured to the grade pole 31 by spring clamps 171.

The motor-driven remote unit 168 consists of a housing 176 formed of a suitable material such as plastic and is generally in the form of a parallelepiped. The housing 176 is provided with a removable cover 177 secured thereto by screws 178 and provides a main compartment 181 and a secondary compartment 182 therein. The housing 176 is provided with tubular extensions 186 and 187 which open into the compartment 182. The extensions 186 and 187 and the secondary compartment 182 are sized to provide a tunnel to accommodate the grade pole 162 and to permit the grade pole to extend therethrough. Motor-driven means 191 is provided within the housing 176 for causing the housing 176 to ascend or descend the grade pole 162. This motorized drive means 191 consists of an electric motor 192 secured to an L-shaped bracket 193 which is secured to the housing 176 by screws 194. The, motor 192 is provided with an output shaft 196 on which is mounted a toothed wheel 197 which is provided with a plurality of circumferentially spaced-apart recesses 198. The shaft 196 extends from within the compartment 181 and through the compartment 182 and is rotatably mounted in the housing 176. A drive roller 201 is secured to the shaft 196 and is driven thereby. The drive roller 201 is provided with an arcuate surface 202 which is adapted to frictionally engage the cylindrical outer surface of the grade pole 162 as shown particularly in FIG. 13 and to frictionally engage the same. The grade pole 162 is yieldably retained in engagement with the drive roller 201 by an idler roller 203 which is also provided with an arcuate surface 204 adapted to engage the side of the grade rod 162 opposite the drive roller 201 (see FIG. 13). The idler roller 203 is rotatably mounted on a shaft 206 which is carried by a U-shaped bracket 207. The U-shaped bracket 207 is mounted upon a leaf spring 208 which has its opposite ends secured to the housing 176 by screws 209. The idler roller 203 is yieldably urged against the grade rod 162 and the grade rod 162 is yieldably urged into engagement with the drive roller 201 by the outwardly bowed but slightly compressed leaf spring 208.

Means is provided for preventing movement of the remote unit 168 and the housing 176 thereof vertically of the grade pole 162 and consists of a solenoid 211 mounted on the bracket 193 and which is provided with an armature or plunger 212. The armature 212 is movable to a position in which it engages one of the recesses 198 of the toothed wheel 197 or to a position out of engagement therewith.

Normally it is desirable that the armature 212 be in engagement with the toothed wheel 197 whenever the motor 192 is de-energized. This is accomplished by use of a coil spring 213 which is disposed on the other side of the bracket 193 and engages the armature 212 to yieldably urge it in a direction towards the toothed wheel 197. When the solenoid 211 is energized, the armature 212 is retracted so that the toothed wheel 197 is free to rotate.

Means is provided within the housing 176 for monitoring or measuring the ascending and descending motion of the remote unit 168 with respect to the grade pole 162 and consists of a wheel 91 of the type hereinbefore described extending through a slot 216 provided in the housing 176, permitting the wheel 91 to engage the grade pole 162. The wheel 91 is mounted in a manner as hereinbefore described and its drive shaft 101 drives a conventional quadrature shaft encoder 217.

Figure 12:
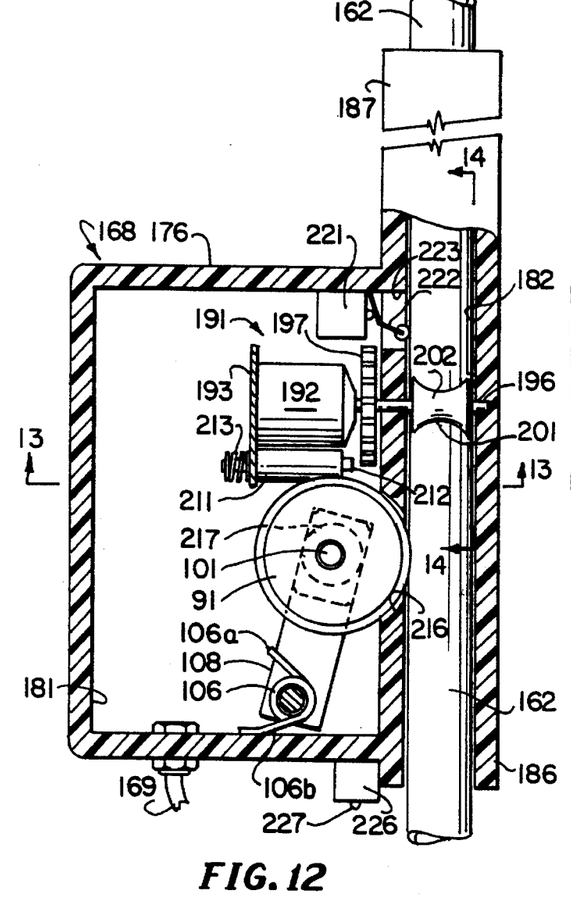
FIG. 12 is a cross-sectional view of the remote unit taken along the line 12—12 of FIG. 13.
Figure 13:
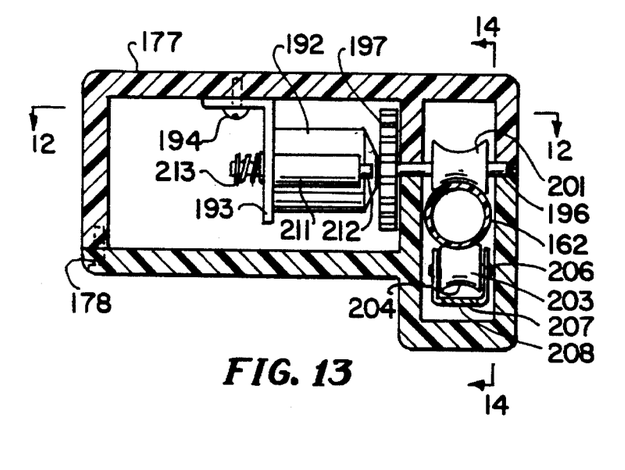
FIG. 13 is a cross-sectional view taken along the line 13—13 of FIG. 12.
Figure 14:
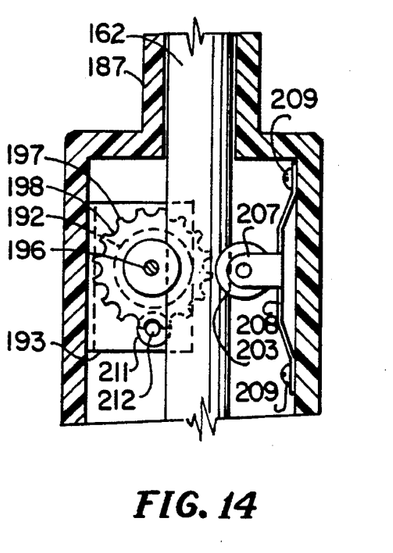
FIG. 14 is a cross-sectional view taken along the line 14—14 of FIG. 12.

An upper limit switch 221, which serves to prevent the remote unit from ascending over the top of the grade pole 162, is mounted in the housing 176 and is provided with an operating arm 222 which extends through a slot 223 provided in the housing 176. The arm 222 lightly engages the grade pole 162 and in the absence of the pole 162 opens the upper limit switch 221, which interrupts current to the motor 192 to prevent further ascent of the remote unit 168. A lower limit switch 226 is provided on the outside of the housing 176 on the lower extremity thereof as shown in FIG. 12 and is provided with an operating arm 227 which is adapted to engage the ground as the remote unit descends and also serves to stop operation of the motor 192 so that the lower extremity 163 of grade pole 172 will not be moved up into the remote unit 168.

The local or control unit 167 consists of a housing unit 231 which also can be of a molded plastic and is provided with a back cover 232 secured thereto by screws 233. The local unit 167 is provided with yieldable spring clasps 171 suitably affixed to the exterior of housing unit 231 for easy attachment of the local unit 167 to the grade pole 162 and easy detachment therefrom. This frees the user's hand from holding local unit 167.

First and second quadrature totalizers 236 and 237 of a conventional type are mounted in the housing 231 and have 6-digit liquid crystal displays 238. Such totalizers are currently available from the Durant division of Eaton Corporation. Each also includes a microcontroller (not shown) and a lithium battery (not shown) and is provided with inputs to accept quadrature logic signals from the shaft encoder 217. A typical quadrature shaft encoder 217 can be a Hewlett Packard HEDS 5500 series or U.S. Digital E2 shaft encoder which are characterized in that they have a 2-bit quadrature output which is made available to the totalizers 236 and 237 through respective forward/reverse switches 241. Each of the totalizers 236 and 237 is provided with a program/ operate switch 242 which is mounted on the front panel of housing 231, as are an on/off switch 243, an up/down switch 244, and a battery-OK light indicator 246.

Operation of the scalable grade measuring apparatus and the displacement display device's system and the system in performing a method in accordance with the present invention may now be described in conjunction with the circuit diagram shown in FIG. 15. The two totalizers 236 and 237 are shown. The top and bottom limit switches 221 and 226 are provided and are in series with the parallel combination of the solenoid 211 and the motor 192 and serve to de-energize the motor 192 whenever the limit switches 221 and 226 are operated.

When either of the limit switches 221 or 226 is operated, the respective diodes D1 or D2 parallel therewith permit subsequent operation of the motor even though the limit switches 221 and 226 have been operated. For example, if the top limit switch 221 has been operated, the operator 163 can operate the up/down switch 244 to energize the motor 192 and to cause the remote unit 168 to descend. Similarly, if the bottom limit switch 226 is operated the diode D2 permits the motor 192 to be energized to cause the remote unit to ascend the grade pole 162.

The quadrature shaft encoder 217 provides two output nodes which are supplied through pull-up resistors R1 and R2 to the forward/reverse switches 241 which permit the signals from the shaft encoder 217 to either be forwarded or reversed when supplied to the quadrature totalizer units 236 or 237.

Figure 15:
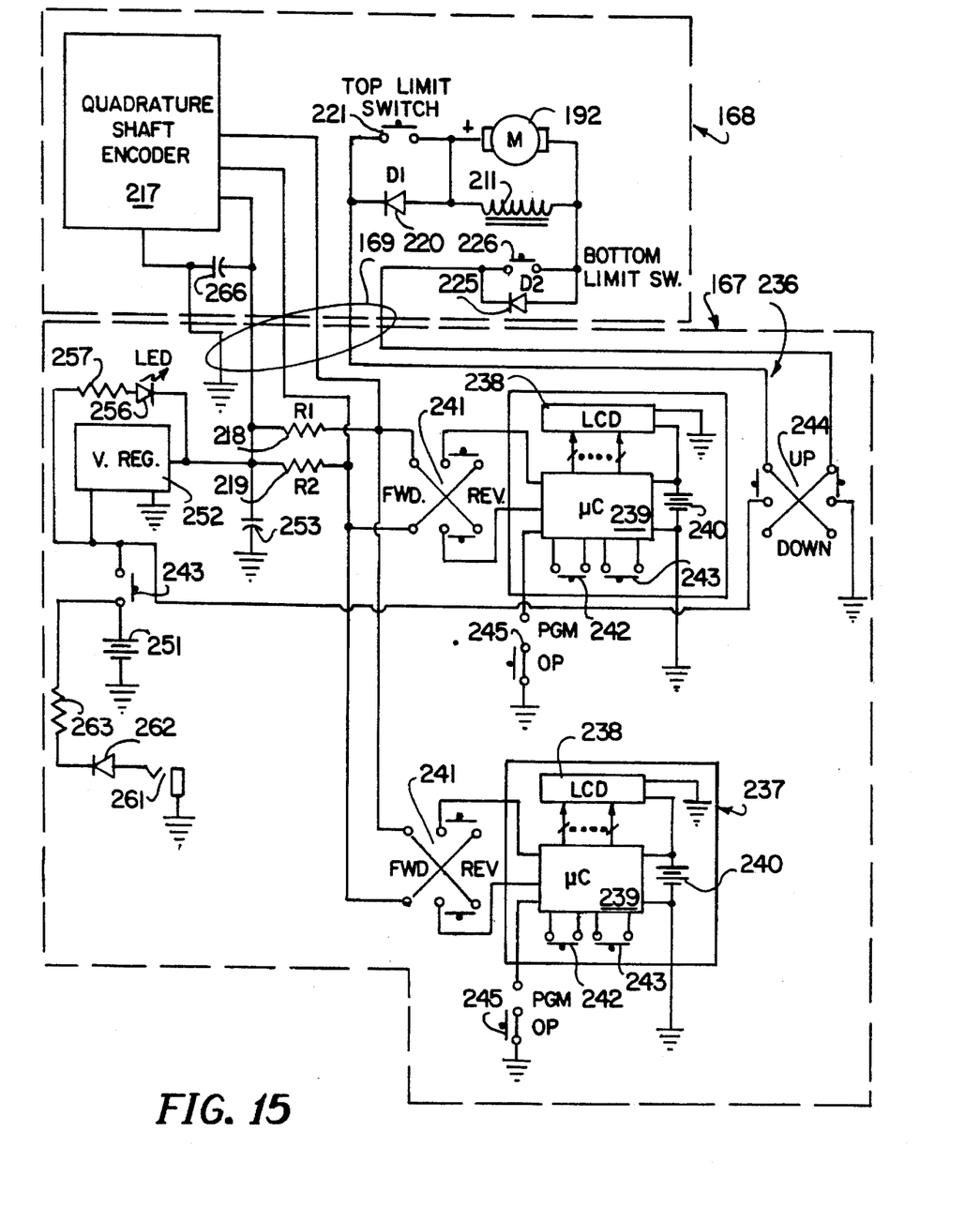
FIG. 15 is a circuit diagram of the electronics utilized in the remote and local units of the apparatus shown in FIG. 9.

The circuitry shown in FIG. 15 includes a battery 251 of a rechargeable type which is connected through the on/off switch 243 to the motor's up/down switch 244 as well as to a voltage regulator 252 which supplies power to other circuitry as shown. A light emitting diode 256 with a series resistor 257 extends around the voltage regulator 252 and serves to give a battery-OK indication in that the light gradually dims as the battery weakens. A jack 261 is provided for supplying auxiliary or recharging power to the local unit 167 and is connected through a diode 262 and a series resistor 263 to the battery 251 side of the switch 243 and parallel with the battery 251. Capacitors 253 and 266 are provided at the output of the voltage regulator to smooth the power supply voltage to the shaft encoder 217 and to resistors R1 and R2.

The operation and use of the grade measuring apparatus 161 with its motor-operated remote unit 168 and its local unit 167 is very similar to that hereinbefore described in conjunction with the manually operated controller 41 with the principal difference being that the motor-operated remote unit makes it possible to carry out measurements on much steeper grades and in that a grade pole 162 can be provided which has a length which is substantially greater than that of the height of a human being. For example, grade poles having lengths 16–20 feet can be used making it possible to carry out grade measurements throughout a relatively wide area without moving the laser beam transmitter. The motor-operated remote unit also makes possible some measurements in areas unsafe for humans, as for example deep, unreinforced trenches.

Figure 9:
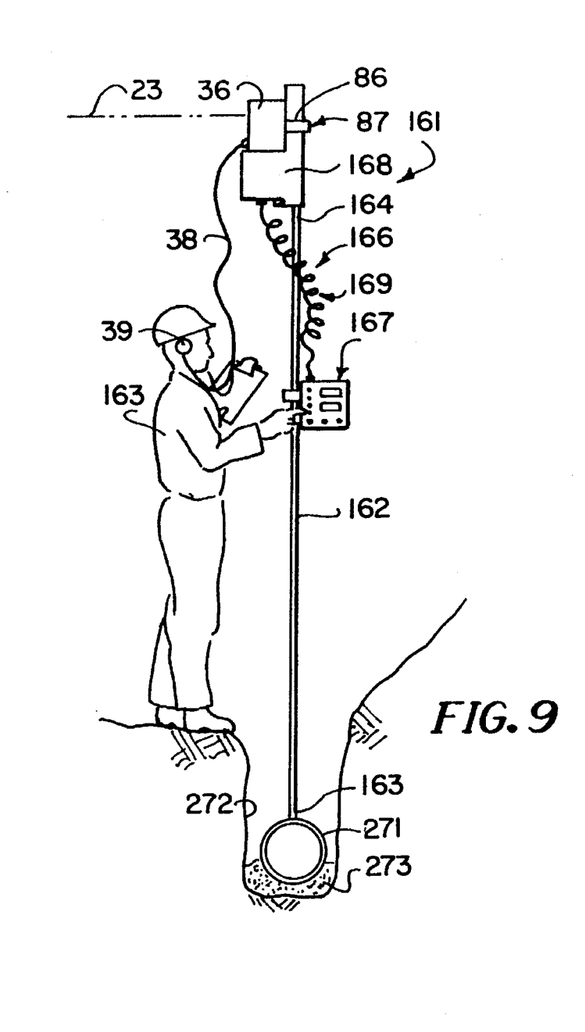
FIG. 9 is a schematic illustration showing the use of a motor-operated scalable measuring apparatus utilizing the system and method incorporating the present invention.
Figure 10:
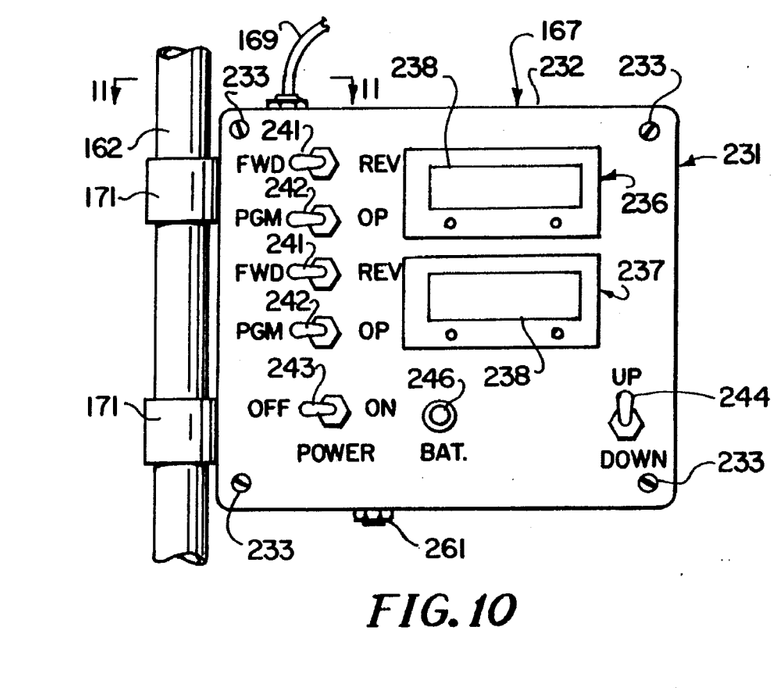
FIG. 10 is a front-elevational view of the local unit shown in FIG. 9.
Figure 11:
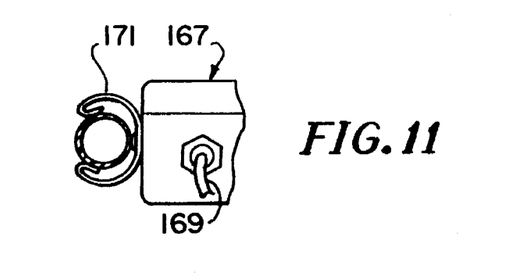
FIG. 11 is a cross-sectional view taken along the line 11—11 in FIG. 10.

As shown in FIG. 9, the apparatus 161 is being utilized for measuring the slope of a pipeline 271 which has been placed in a trench 272 partially filled with sand 273. The operator 163 can carry out operations by operating the appropriate toggle switches on the local unit 167 which is positioned at an elevation just below his eyes shown particularly in FIG. 9. Thus, it can be seen that the operator 163 by utilizing the local unit can readily carry out the measurements hereinbefore described with the apparatus 21 hereinbefore described with the principal difference being that the remote unit 168 which is connected by the cable 169 to the local unit 167 ascends and descends the grade pole 162 under the control of the operator until it comes to the level of the laser beam 23.

From the foregoing it can be seen that the apparatus can be readily used for measuring large variations and grade without moving the laser beam transmitter. The measurements can still be carried out by a single operator.

What is claimed is:

1. A scalable measuring apparatus for use by an operator with a laser beam from a laser-level transmitter, comprising a grade pole free of markings having an outer cylindrical surface and having lower and upper extremities, said grade pole being adapted to be vertically positioned during use, a laser-level receiver for detecting the laser beam, control means mounted on said grade pole and carrying said laser-level receiver, at least a portion of said control means being capable of ascending and descending said grade pole and indicator means for giving a response perceptible to the operator when the laser beam is detected by the laser-level receiver, said portion of the control means having brake means for retaining said portion of the control means at a predetermined position with respect to said grade pole, said brake means including a brake shoe having a curved surface adapted to engage the cylindrical outer surface of the grade pole, yieldable means carried by said portion of the control means for yieldably urging the brake shoe into engagement with the grade pole so that said portion of the control means is retained at said predetermined position with respect to said grade pole and means carried by said portion of the control means including a manually operated member adapted to be engaged by the human hand for movement of the brake shoe out of engagement with the grade pole against the force of the yieldable means to permit said portion of the control means to be moved to ascend or descend said grade pole and whereby upon release of the manually operated member the brake shoe automatically engages the grade pole.

2. Apparatus as in claim 1 wherein said control means includes a sensing wheel engaging the outer cylindrical surface of the grade pole and being rotated as said portion of the control means is moved to ascend and descend the grade pole, a quadrature shaft encoder driven by said sensing wheel and providing a quadrature signal display means and electrical means for receiving said quadrature signal and supplying an output to the display means representing the direction of rotation and the distance traveled by the sensing wheel while the electrical means is receiving said quadrature signal.

3. Apparatus as in claim 1 wherein a preselected scale has been inserted in the control means, said control means including a housing having an opening therein through which the grade pole extends, at least a portion of said housing having a predetermined unit length or having markings thereon which correspond to a predetermined unit length utilized for checking the calibration of the preselected scale in the control means.

4. Apparatus as in claim 1 for use in ascertaining the depth of a cut or fill to be made together with a spring clamp removably secured to and yieldably engaging the cylindrical outer surface of the grade pole at a predetermined position with respect to the control means and being positioned so that the space between the spring clamp and the control means locates the depth of the additional cut or fill to be made.

5. A scalable measuring apparatus for use by an operator with a laser beam from a laser-level transmitter comprising a vertically disposed grade pole free of markings having lower and upper extremities, a laser-level receiver for detecting the laser beam, control means mounted on said grade pole and carrying said laser-level receiver, at least a portion of said control means being capable of ascending and descending said grade pole and indicator means for giving a response perceptible to the operator when the laser beam is detected by the laser-level receiver, said control means having brake means for retaining said control means at a predetermined elevation with respect to said grade pole, means carried by said control means permitting said control means to ascend and descend said grade pole, said control means being in the form of a remote unit and a local unit, said remote unit having a housing having an opening therein through which the grade pole extends, drive roller means mounted in the housing and engaging the grade pole, motor-driven means carried by the housing for causing rotation of the drive roller means to cause the remote unit to ascend or descend the grade pole and retaining means for retaining said remote unit at a predetermined elevation on said grade pole when the motor-driven means is not in operation, said retaining means including a toothed wheel driven by the motor-driven means and electromechanical means carried by the housing for engaging the toothed wheel for preventing rotation of the toothed wheel when the motor-driven means is deenergized.

6. Apparatus in claim 5 wherein said motor driven means includes an idler roller disposed on the side of the grade pole opposite the drive roller and spring means yieldably urging the idler roller into engagement with the grade pole and to move the grade pole into engagement with the drive roller.

7. A control unit for use in a scalable measuring apparatus for use by an operator with a laser beam from a laser-level transmitter and a laser-level receiver and a grade pole, comprising a housing, said housing having a hollow member mounted therein, said member having an opening therein through which the grade pole is adapted to extend, means carried by the housing permitting the housing to be raised and lowered with respect to the grade pole, a sensing wheel mounted in the housing and extending through the hollow member and being adapted to engage the grade pole and sensing the relative movement between the grade pole and the housing, display means carried by the housing for displaying a number representative of the distance of travel of the sensing wheel and the direction of rotation of the sensing wheel, motor-driven means engaging the grade pole when the grade pole is disposed in the opening for causing ascending and descending movement of the housing relative to the grade pole and means for preventing movement of the housing relative to the grade pole when the motor drive means is deenergized, said means for preventing movement of the housing relative to the grade pole including a toothed wheel driven by the motor-driven means and electromechanical means carried by the housing for engaging the toothed wheel when the motor-driven means is deenergized.

8. A control unit as in claim 7 wherein said member and said housing carry a precise unit of length for verifying calibrations and scale factor.

9. A control unit as in claim 7 wherein said sensing wheel is provided with a peripheral surface and first and second spaced-apart parallel o-rings mounted on said surface and being adapted to tangetially engaged the cylindrical outer surface of the grade pole.

* * * * *